United States Patent [19]

Nakaya

[11] 4,279,080
[45] Jul. 21, 1981

[54] TOUCH SIGNALLING PROBE

[75] Inventor: Tadao Nakaya, Utsunomiya, Japan

[73] Assignee: Mitutoyo Mfg. Co. Ltd., Tokyo, Japan

[21] Appl. No.: 181,657

[22] Filed: Aug. 26, 1980

[30] Foreign Application Priority Data

Aug. 28, 1979 [JP] Japan .......................... 54-118251[U]

[51] Int. Cl.$^3$ ................................................ G01B 7/02
[52] U.S. Cl. ................................ 33/174 L; 33/169 R; 33/172 E; 33/174 Q
[58] Field of Search ............ 33/174 L, 174 P, 172 E, 33/169 R

[56] References Cited

U.S. PATENT DOCUMENTS

| | | | |
|---|---|---|---|
| 4,136,458 | 1/1979 | Bell et al. | 33/174 L |
| 4,138,823 | 2/1979 | McMurtry | 33/174 L |
| 4,153,998 | 5/1979 | McMurtry | 33/174 L |
| 4,155,171 | 5/1979 | McMurtry | 33/174 L |
| 4,158,919 | 6/1979 | McMurtry | 33/174 L |

Primary Examiner—Willis Little
Attorney, Agent, or Firm—Koda and Androlia

[57] ABSTRACT

A touch signalling probe including a probe shaft having a touch sensor on its pointed end, an insulated contact base plate which is fixed to a probe case and has an aperture in its center through which the probe shaft can be penetrated, two sets of upper contact pair and two sets of lower contact pair attached on the upper and the reverse side of the insulated contact base plate, each set of which has two contact members, upper and lower contact arms fixed to the probe shaft and keeping contact with each of contact members, a probe tube slidingly moving along the probe shaft, a spring providing the urging force, and detecting lead wires connecting the respective contact members in series.

1 Claim, 6 Drawing Figures

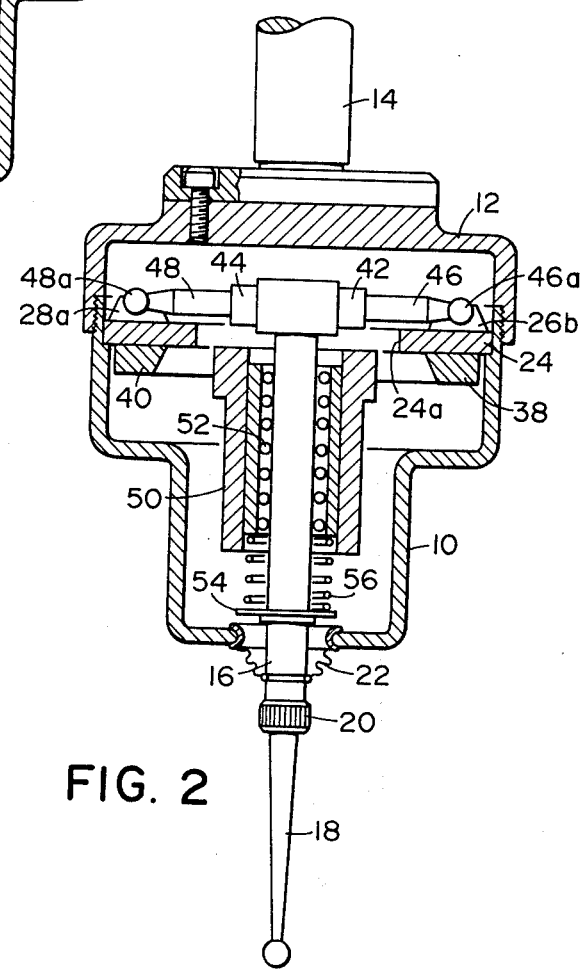

TOUCH SIGNALLING PROBE

BACKGROUND OF THE INVENTION

1. Field of Invention

The present invention relates to a touch signalling probe, in particular to a touch signalling probe which is able to detect a touch signal against all directions with high sensitivity.

2. Description of Prior Art

There have been used various measuring machines or three dimensional coordinate measuring machine, etc. in order to detect and measure a position, a size or a shape of an article. With the measuring machinery is equipped a touch signalling probe which detects contact with the article to be measured, and a touch sensor of the probe electrically detect a state in which the touch sensor is kept contact with the article to be measured at a predetermined measuring position. The ordinary touch signalling probe has an electric contact means which is linked with the touch sensor so that mechanical movements of the touch sensor by the contact with the article to be measured can be detected as an electric conductive state or as an electric non-conductive state. In the conventional touch signalling probe, however, there are such drawbacks that quality of the parts must be controlled with remarkably severe accuracy and that a lot of labor must be required for the assembly and the adjustment of the probe in order to obtain the probe with high accuracy.

SUMMARY OF THE INVENTION

Accordingly, it is an object of the present invention to provide an improved touch signalling probe which can perform accurate detecting action in spite of parts usage with comperatively rough accuracy and without adjustment required after the assembly.

In keeping with the principle of the present invention, the object is accomplished with the touch signalling probe which includes a probe shaft having a touch sensor on its pointed end, an insulated base plate which is fixed to a probe case and which has an aperture in its center through which the probe shaft can be penetrated, two sets of upper contact pair attached on the upper side of the insulated contact base plate, each set of which has two contact members arranged in the vicinity in the insulated state, and which are symmetrically located with respect to the probe shaft, two sets of lower contact pair attached under the reverse side of the insulated contact base plate, each set of which has two contact members arranged in the vicinity in the insulated state, and which are located in the direction of a right angle against two sets of upper contact pair, two upper contact arms insulatedly fixed to the probe shaft and keeping contact over with each of the contact members of both upper contact pairs, a probe tube slidingly moving along the probe shaft, two lower contact arms insulatedly fixed to the probe tube and keeping contact over with each of contact members of both lower contact contact pairs, a spring installed between the probe shaft and the probe tube in order to provide the urging force by which the upper contact arms and the lower contact arms put to maintain the upper contact pairs and the lower contact pairs between the upper and the lower contact arms, and detecting lead wires connecting the respective contact members in series.

BRIEF DESCRIPTION OF THE DRAWINGS

The above mentioned and other features and object of the present invention will become more apparent by reference of the folowing description taken in conjunction with the accompanying drawings, wherein like referenced numerals denote like elements in which:

FIG. 1 is a sectional view showing the preferred embodiment of a touch signalling probe in accordance with the teaching of the present invention;

FIG. 2 is a sectional view taken on line II—II in FIG. 1;

DESCRIPTION OF THE PREFERRED EMBODIMENT

Figure 3:
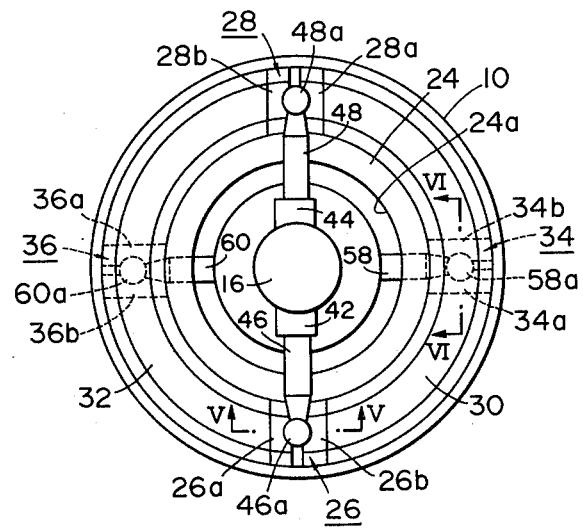
FIG. 3 is a top view showing the state in which a case lid is uncovered in FIG. 1.

Referring to FIG. 1, shown therein is a preferred embodiment of a touch signalling probe in conjunction with the teachings of the present invention. In FIG. 2, illustrated therein is a section taken on line II—II in FIG. 1, and in FIG. 3 shown is a top view in which a lid of case is uncovered in FIG. 1.

In FIG. 1, a probe lid is screwed down on a probe case 10, and a shank 14 fixed to the probe lid 12 is attached to three dimentional coordinate measuring machines, etc., which are not illustrated. Inside of the probe case 10 installed is a probe shaft 16 which is held to displace freely, and on the point end of the probe shaft 16 attached is a touch sensor 18. In the embodiment, the touch sensor 18 can be detouchably attached to the probe shaft 16 by a screw portion 20 so that the desired touch sensor 18 can be selected in accordance with a shape of an article to be measured. Between the probe case 10 and the probe shaft 16 installed is a bellows 22, which enables the probe shaft 16 to displace to any direction and prevents irruption of water or dust into the probe case 10.

Figure 4:
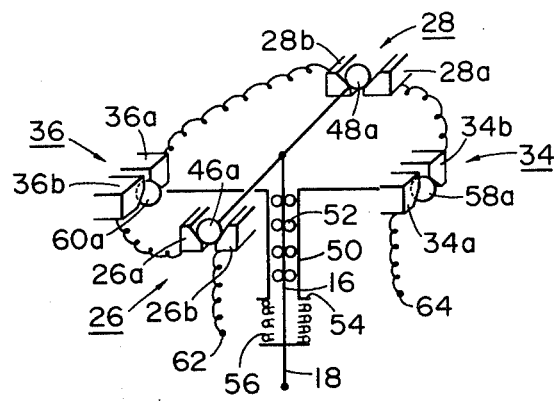
FIG. 4 is an illustration of electric wiring connection in the embodiment shown in FIG. 1.

Inside of the probe case 10 attached is an insulated contact base plate 24 by bond, etc., and there is an aperture 24a in the center of the insulated contact base plate 24 through which the above mentioned probe shaft 16 can be penetrated. On the top side of the insulated contact base plate 24 attached are upper contact pairs 26 and 28, each of which has two contact members 26a and 26b or 28a and 28b arranged in the vicinity in the respectedly insulated state, and which are symmetrically located with respect to the probe shaft 16. Each of the contact members 26a, 26b, 28a and 28b has the slant of facing portion, as shown in FIG. 4, so that each of the upper contact pair forms V shape groove. In order to place the above mentioned upper contact pairs 26 and 28 at predetermined positions, semicircular guide rings 30 and 32 are attached on the upper side of the insulated contact base plate 24 so that the above mentioned contact members can be positioned and fixed at the end portion of each of the semicircular guide rings 30 and 32.

In the same manner as mentioned in the above, under the insulated contact base plate 24 are attached lower contact pairs 34 and 36, each of which includes contact members 34a and 34b or 36a and 36b, and forms V shape groove with downward opening. Each of contact members is arranged in the vicinity in the respectively insulated state, and placed to be positioned by semicircular guide rings 38 and 40 so that they can be located in the direction of a right angle against the afore-mentioned upper contact pairs 26 and 28.

On the upper end of the probe shaft 16 are fixed upper contact arms 46 and 48 with insulating bushes 42 and 44 inbetween, and contact spheres 46a and 48a formed at the end of the respective contact arms 46 and 48 hold contact over with each of the above mentioned contact members 26a and 26b or 28a and 28b.

The probe shaft 16 is loosely attached by a probe tube 50 slidingly moving along. In order to make smooth movement plural guide balls 52 are used between the lower end of the probe tube 50 and a holder 54 fixed to the probe shaft 16, and urging force is provided between the probe shaft 16 and the probe tube 50.

Figure 5:
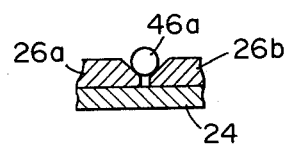
FIG. 5 is a sectional view taken on line V—V in FIG. 3.
Figure 6:
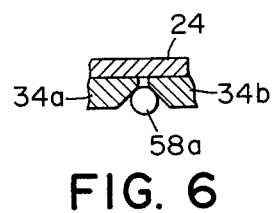
FIG. 6 is a sectional view taken on line VI—VI in FIG. 3.

To the probe tube 50 lower contact arms 58 and 60 are fixed, and contact spheres 58a and 60a formed at the end of arms 58 and 60 hold contact over with each of contact members 34a and 34b or 36a and 36b of the afore-mentioned lower contact pairs 34 and 36. In order to insulate the lower contact arms from the other elements, it is preferred to compose the probe tube 50 with an insulation material in the embodiment. In the illustrated assembled state, upper contact arms 46 and 48 and lower contact arms 58 and 60 put upper contact pairs 26 and 28 and lower contact pairs 34 and 36 inbetween by the urging force of the spring 56 so that the touch sensor 18 can be determined its posture. In other words, on the upper side of the insulated contact base plate 24, as shown in FIG. 5, the contact spheres 46a and 48a of the upper contact arms 46 and 48 are held over the V shape groove of the respective upper contact pairs 26 and 28. In the same manner, under the insulated base plate 24, the contact spheres 58a and 60a of the lower contact arms 58 and 60 are held over the V shape groove of the lower contact arms 34 and 36 as illustrated in FIG. 6.

In FIG. 4, shown therein is an illustration of electric wiring connection of each contact members in accordance with the teachings of the present invention. In such state that each of contact arms 46, 48, 58 and 60 are correctly accommodated at the contact pairs 26, 28, 34 and 36, a series circuit is formed from a terminal 62 to a terminal 64 by way of the contact member 26b, the contact sphere 46a, the contact member 26a, the contact member 36b, the contact sphere 60a, the contact member 36a, the contact member 28b, the contact sphere 48a, the contact member 28a, the contact member 34b, the contact sphere 58a and the contact member 34a. Each of the terminals 62 and 64 are connected to an external electric circuit, which is not illustrated. In such state that the touch sensor 18 does not keep in touch with an article to be measured, a conducting signal is put out to the outside, and when the touch sensor 18 touches an article to be measured to have any contact sphere is released from the respective corresponding contact pairs, a non-conducting signal is put out to an external circuit.

In the illustrated state, the touch sensor 18 does not touch an article to be measured. In this state each of the contact spheres of the contact arms is holdingly positioned with the accommodation at the corresponding contact pairs, and this positioned state is always determined at one fixed place.

In case the touch sensor 18 touches an article to be measured at any direction, either one of the contact spheres is released out of the corresponding contact member to put out the non-conducting signal to the outside so that the position of an article to be measured can be detected with high accuracy.

As described heretofore, the present invention can provide a touch signalling probe which can detect touch toward any direction with high accuracy.

In the embodiment, in order to keep the insulation of the contact arms the insulating bushes and the probe tube made of insulation material are used therein. The present invention, however, need not be limited in the ways mentioned heretofore, but any desired insulation structure can be adapted. It is also possible for the insulated contact base plate 24 to be composed of a metal plate coated with some insulating material.

As mentioned in the above, the present invention can provide a touch signalling probe which can be assembled with extreme ease without using any highly accurate parts and, furthermore, which can be handled easily since the fixed position of the touch sensor is determined at one place without adjustment required after the assembly.

What is claimed is:

1. A touch signalling probe comprising:
   a probe shaft having a pointed end;
   a touch sensor on the pointed end of said probe shaft;
   a insulated contact base plate fixed to a probe case and having an aperture in the center through which said probe shaft can be penetrated;
   two sets of upper contact pair attached on the upper side of said insulated contact base plate, each set of which has two contact members arranged in the vicinity in the insulated state, and which are symmetrically located with respect to said probe shaft;
   two sets of lower contact pair attached under the reverse side of said insulated contact base plate, each set of which has two contact members arranged in the vicinity in the insulated state, and which are located in the direction of a right angle against said two sets of upper contact pair;
   two upper contact arms insulatedly fixed to said probe shaft, and keeping contact over with each of contact members of both said upper contact pairs;
   a probe tube slidingly moving along said probe shaft;
   two lower contact arms insulatedly fixed to said probe tube and keeping contact over with each of contact members of both said lower contact pairs;
   a spring insulated between said probe shaft and said probe tube in order to provide urging force by which said upper contact arms and said lower contact arms put to maintain said upper contact pairs and said lower contact pairs between said upper contact arms and said lower contact arms; and
   detecting lead wires connecting said respective contact members in series.

* * * * *